US011364804B2

(12) United States Patent
Sudoh et al.

(10) Patent No.: US 11,364,804 B2
(45) Date of Patent: Jun. 21, 2022

(54) DISPLAY SYSTEM FOR MODE INFORMATION DISPLAY

(71) Applicant: Honda Motor Co., Ltd., Tokyo (JP)

(72) Inventors: Takashi Sudoh, Torrance, CA (US); Andrew R. Hoover, West Liberty, OH (US); David Justin Brewer, Columbus, OH (US); Cody D. Grebe, Marysville, OH (US); Jerome L. Piche, Camarillo, CA (US)

(73) Assignee: Honda Motor Co., Ltd., Tokyo (JP)

( * ) Notice: Subject to any disclaimer, the term of this patent is extended or adjusted under 35 U.S.C. 154(b) by 417 days.

(21) Appl. No.: 16/714,237

(22) Filed: Dec. 13, 2019

(65) Prior Publication Data

US 2021/0178900 A1 Jun. 17, 2021

(51) Int. Cl.
| | |
|---|---|
| *G02B 27/01* | (2006.01) |
| *H04N 9/31* | (2006.01) |
| *G02F 1/137* | (2006.01) |
| *B60K 37/06* | (2006.01) |
| *B60K 37/02* | (2006.01) |
| *B60K 35/00* | (2006.01) |
| *B60W 50/00* | (2006.01) |

(52) U.S. Cl.
CPC ............. *B60K 37/06* (2013.01); *B60K 35/00* (2013.01); *B60K 37/02* (2013.01); *B60W 50/0098* (2013.01); *G02B 27/0101* (2013.01); *B60K 2370/113* (2019.05); *B60K 2370/186* (2019.05); *G02B 2027/0141* (2013.01)

(58) Field of Classification Search
CPC .......................... G06F 3/0482; G06F 3/04842
See application file for complete search history.

(56) References Cited

U.S. PATENT DOCUMENTS

| | | | |
|---|---|---|---|
| 6,667,726 B1 | 12/2003 | Damiani et al. | |
| 6,812,942 B2 | 11/2004 | Ribak | |
| 7,786,851 B2 | 8/2010 | Drew et al. | |
| 7,963,656 B2 | 6/2011 | Kuno et al. | |
| 8,717,157 B2 | 5/2014 | Watanabe et al. | |
| 9,007,199 B2 | 4/2015 | Yamada | |
| 9,851,882 B2 | 12/2017 | Dai | |
| 10,040,354 B2 | 8/2018 | Fujita et al. | |
| 2007/0132572 A1 | 6/2007 | Itoh et al. | |

(Continued)

FOREIGN PATENT DOCUMENTS

| | | |
|---|---|---|
| DE | 102005035481 A1 | 2/2007 |
| DE | 102014009998 A1 | 12/2015 |

(Continued)

*Primary Examiner* — Nan-Ying Yang
(74) *Attorney, Agent, or Firm* — Suzanne Gagnon; American Honda Motor Co., Inc.

(57) ABSTRACT

A display system for a vehicle is provided. The display system includes a display device, and control circuitry that is coupled to a user input device and the display device. The control circuitry controls the display device to display a user interface (UI) having a UI element and changes a first opacity level of a first mode text for an outgoing mode of the vehicle, up to a first value so as to mask the first mode text within the UI element. The control circuitry further controls the display device to change a second opacity level of a second mode text for an incoming mode of the vehicle, up to a second value so as to unmask the second mode text within the UI element.

20 Claims, 5 Drawing Sheets

(56) References Cited

U.S. PATENT DOCUMENTS

| | | | |
|---|---|---|---|
| 2012/0124625 A1* | 5/2012 | Foote | H04L 51/32 |
| | | | 725/53 |
| 2016/0314752 A1 | 10/2016 | Nakano et al. | |
| 2017/0297496 A1* | 10/2017 | Onaka | H04N 21/47 |
| 2020/0209623 A1* | 7/2020 | Kim | H04N 9/3161 |

FOREIGN PATENT DOCUMENTS

| | | |
|---|---|---|
| EP | 2105340 A1 | 9/2009 |
| JP | 5986744 B2 | 9/2013 |
| JP | 2014004845 A | 1/2014 |
| KR | 10-1526118 B1 | 6/2015 |
| WO | 2015045328 A1 | 4/2015 |

* cited by examiner

DISPLAY SYSTEM FOR MODE INFORMATION DISPLAY

BACKGROUND

In-vehicle displays, especially, multi-information displays (MIDs), include various UI elements for different vehicle-related parameters and/or user-related parameters. Vehicles that offer various driving modes typically have a particular UI element reserved to display information related to a current driving mode of the vehicle. However, in many instances, display of such information may appear to be less fluid and more rigid, especially at times when such information needs to be updated. This may affect visual ergonomics of the information and the driver may, at times, find the information to be less engaging for an emotion level that the driver might experience while driving in the current driving mode.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

In accordance with an embodiment of the disclosure, a display system may be provided for a vehicle. The display system may include a display device and control circuitry that may be communicatively coupled to a user input device and the display device. The control circuitry may be configured to control the display device to display a user interface (UI) comprising a UI element. The control circuitry may be further configured to receive a user input based on an input from the user input device and control the display device to change a first opacity level of a first mode text for an outgoing mode of the vehicle, up to a first value so as to mask the first mode text within the UI element. The first opacity level of the first mode text may be changed based on the received user input. The control circuitry may be further configured to control the display device to change a second opacity level of a second mode text for an incoming mode of the vehicle, up to a second value so as to unmask the second mode text within the UI element. The second opacity level of the second mode text may be changed based on the first mode text being masked and the received user input. The control circuitry may be further configured to control the display device to move the second mode text within the UI element while changing the second opacity level of the second mode text.

In accordance with another embodiment of the disclosure, a display system may be provided for a vehicle. The display system may include a display device and control circuitry that may be communicatively coupled to a user input device and the display device. The control circuitry may be configured to control the display device to display a user interface (UI) including a UI element. The control circuitry may be further configured to receive a user input based on an input from the user input device and control the display device to change a first opacity level of a first mode text for an outgoing mode of the vehicle, up to a first value so as to mask the first mode text within the UI element. The first opacity level of the first mode text may be changed based on the received user input. The control circuitry may be further configured to control the display device to change a second opacity level of a second mode text for an incoming mode of the vehicle, up to a second value so as to unmask the second mode text within the UI element. The second opacity level of the second mode text may be changed based on the first mode text being masked and the received user input.

In accordance with another embodiment of the disclosure, a method may be provided for controlling a display system of a vehicle. Any display system may execute operations specified in the method. The method may include controlling the display device to display a user interface (UI) including a UI element. The method may further include receiving a user input based on an input from the user input device and controlling the display device to change a first opacity level of a first mode text for an outgoing mode of a vehicle, up to a first value so as to mask the first mode text within the UI element. The first opacity level of the first mode text may be changed based on the received user input. The method may further include controlling the display device to change a second opacity level of a second mode text for an incoming mode of the vehicle, up to a second value so as to unmask the second mode text within the UI element. The second opacity level of the second mode text may be changed based on the first mode text being masked and the received user input. The method may further include controlling the display device to move the second mode text within the UI element while changing the second opacity level of the second mode text.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1:
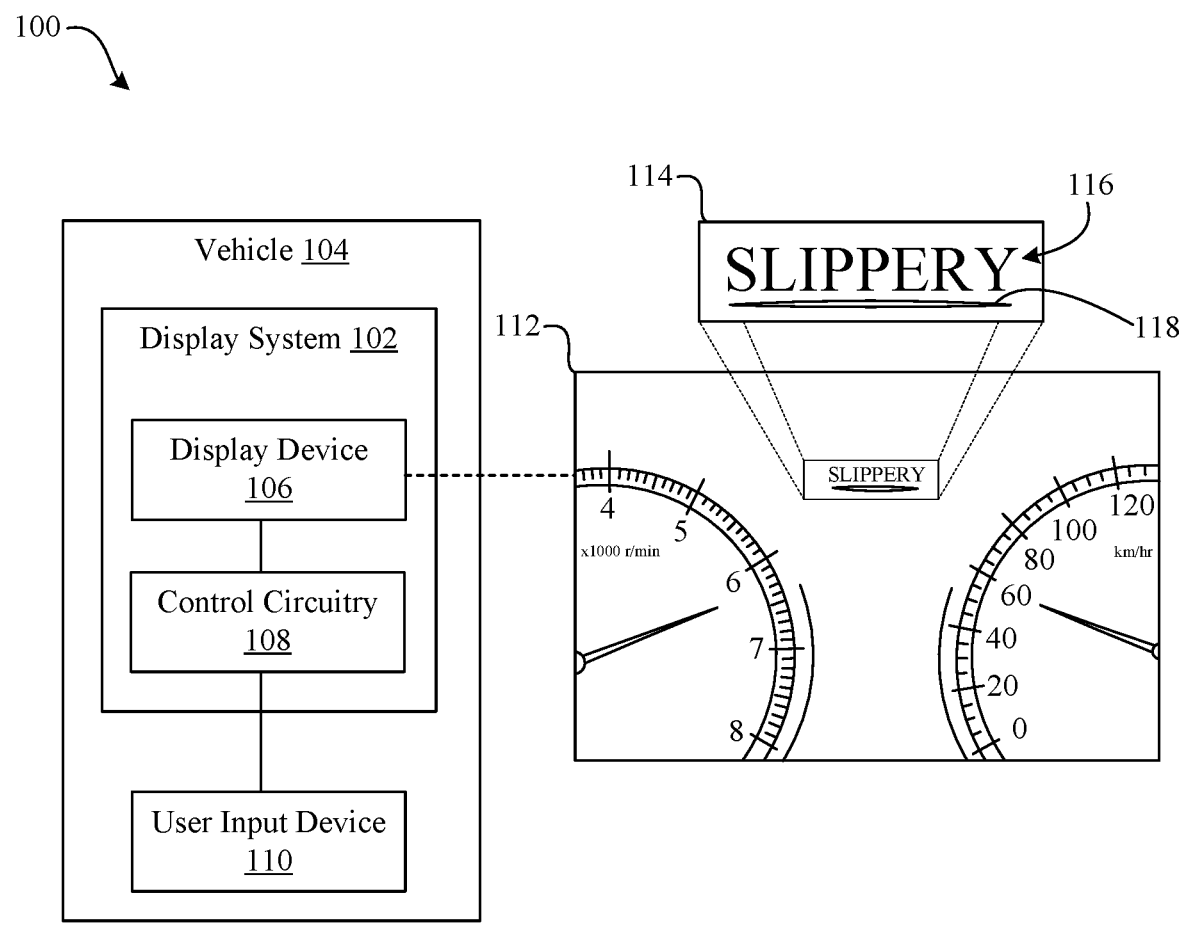
FIG. 1 is an exemplary diagram that illustrates a display system for displaying mode information of a vehicle, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed display system for mode-information display, for example, vehicle mode information. Exemplary aspects of the disclosure may provide a display system that includes a display device to display mode information for a current driving mode, for example, a slippery mode, a comfort mode, a normal mode, a sports mode, a track mode, an economy mode, and the like. The disclosed display system allows the user to cycle through information for various driving modes, while providing a smoother and a fluid transition between information particular to individual driving modes. This, especially, enhances the visual ergonomics of the information and helps the driver to engage with the information as the information for the driving mode is displayed to match an emotion level of the driver.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is an exemplary diagram that illustrates a display system for displaying mode information of a vehicle, in accordance with an embodiment of the disclosure. With reference to FIG. 1, there is shown an exemplary diagram 100. In the exemplary diagram 100, there is shown a display system 102, as part of a vehicle 104. The display system 102 may include a display device 106 and control circuitry 108 communicatively coupled to the display device 106 and a user input device 110. The user input device 110 may be installed inside the vehicle 104 and at a location from where a driver of the vehicle 104 may be able to access the user input device 110 while being seated on the driving seat. The display device 106 may include a user interface (UI) 112 to display information related to various operational parameters (e.g., driving mode(s), vehicle speed, engine rotation) of the vehicle 104. As an example, the UI 112 may include a UI element 114 to display current mode information for a particular driving mode of the vehicle 104.

The display system 102 may include suitable logic, circuitry, interfaces and/or code that may be configured to manage display of support information for different operational parameters of the vehicle 104. The support information may include mode information related to various driving modes of the vehicle 104. In certain instances, the support information may also include, for example, speed-related information, engine speed (i.e. a digital tachometer), Advanced Driver-Assistance System (ADAS) related information, and fuel information. The display system 102 may be also responsible for animation or transition effects with changes in the displayed support information over time and based on user inputs. Examples of the display system 102 may include, but are not limited to, an in-vehicle infotainment system, a navigation system, an Internet-enabled communication system, and other Heads-Up-Display (HUD) or non-HUD information display systems.

The vehicle 104 may be a non-autonomous vehicle, a semi-autonomous vehicle, or a fully autonomous vehicle, for example, as defined by National Highway Traffic Safety Administration (NHTSA). Examples of the vehicle 104 may include, but are not limited to, a two-wheeler vehicle, a three-wheeler vehicle, a four-wheeler vehicle, a hybrid vehicle, or a vehicle that uses one or more distinct renewable or non-renewable power sources. Examples of the four-wheeler vehicle may include, but are not limited to, an electric car, a hybrid vehicle an internal combustion engine (ICE)-based car, a fuel-cell based car, a solar powered-car, or a hybrid car.

The display device 106 may include suitable logic, circuitry, interfaces and/or code that may be configured to display the support information for the different operational parameters of the vehicle 104. The display device 106 may be, for example, a multi-information display (MID) panel, a digital instrument cluster, or an automotive HUD. Additionally, in certain instances, the display device 106 may include a touch screen, which may enable a user to provide the user-input via the display device 106. The display device 106 may be realized through several known technologies such as, but not limited to, at least one of a Liquid Crystal Display (LCD) display, a Light Emitting Diode (LED) display, a plasma display, or an Organic LED (OLED) display technology, or other display devices. In at least one embodiment, the display device 106 may refer to a display screen of a head mounted device (HMD), a smart-glass device, a see-through display, a projection-based display, an electro-chromic display, or a transparent display.

The control circuitry 108 may include suitable logic, circuitry, and interfaces that may be configured to execute program instructions associated with different operations for display of the support information on the display device 106. Some of the operations may be related to the mode information for driving modes of the vehicle 104 and a control of, for example, a layout of UI elements in the UI 112 and transition effects for the mode information. The control circuitry 108 may include one or more specialized processing units, which may be implemented as an integrated processor or a cluster of processors that collectively perform the functions of the one or more specialized processing units. The control circuitry 108 may be implemented based on a number of processor technologies known in the art. Examples of implementations of the control circuitry 108 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits. In at least one embodiment, the control circuitry 108 may be implemented as a specialized in-vehicle Electronics Control-Unit (ECU) among several other ECUs of the vehicle 104.

The user input device 110 may include suitable logic, circuitry, and interfaces that may be configured to receive a user input and communicate the received user input to the control circuitry 108. The user input device 110 may include a digital interface (e.g., a touch interface or a voice-controlled interface) to provide the user input. Alternatively, the user input device 110 may include a physical structure, which, when maneuvered physically, converts such maneuver into the user input. In such cases, the physical structure of the user input device 110 may include a gripping portion to allow the user to hold onto the physical structure. The user input may be a result of rotational movement (bi-directional), a linear movement (bi-directional), or a pressing action of the physical structure. Examples of the user input device 110 may include, but are not limited to, a knob, a slider, a switch, a physical button, a touch screen, and a microphone.

The UI 112 may be an application interface rendered on the display device 106. The UI 112 may include one or more UI elements (e.g., the UI element 114) configured to display information related to various operational parameters of the vehicle 104. The operational parameters may include, for example, vehicle speed information, engine speed information, the mode information, and the like. An example of the UI 112 may be a Graphical UI (GUI). The GUI may be configured to display graphical elements that may correspond to user-viewable content for mode selection, display control, and other interactive user-options.

In operation, the control circuitry 108 may be configured to control the display device 106 to display the UI 112 on the display device 106. The UI 112 may include a UI element 114 having a suitable aspect ratio for displaying the mode information for a current driving mode of the vehicle 104. This UI element 114 may visually assist the driver of the vehicle 104 to cycle through different driving modes of the vehicle 104. Examples of the different driving modes may include, but are not limited to, a slippery mode, a comfort mode, a normal mode, a sports mode, a track mode, and an economy mode. Each driving mode may correspond to a particular configuration for certain vehicle components, for example, power steering functions, throttle functions, transmission handling functions, braking functions, turbocharger functions, and the like. For every driving mode, the mode information may include a separate mode text and/or one or more graphic elements. As shown, for example, in cases where the current driving mode is set to be the slippery mode, the UI element 114 may include the mode text 116 as "SLIPPERY" along with the graphic element 118 as a graphic line or bar below the mode text 116.

At any time, a user input may be received by the control circuitry 108 based on an input via the user input device 110. Upon receiving the user input, the control circuitry 108 may map the user input to changes in the mode information displayed on the display device 106. Such changes may be either related to, for example, text size, color, opacity, text animation effects, or content of the mode information. Based on the received user input, the current driving mode may be determined to be the outgoing mode while an upcoming driving mode preceding or succeeding the current driving mode may be determined as the incoming mode.

The control circuitry 108 may control the display device 106 to change a first opacity level of a first mode text for the outgoing mode of the vehicle 104. Such a change may be based on the received user input and may be made up to a first value (e.g., a maximum opacity value) so as to mask the first mode text within the UI element 114. In an exemplary embodiment, once the first mode text is masked, the UI element 114 may be ready to transition to a second mode text for the incoming mode. Thus, the control circuitry 108 may control the display device 106 to change a second opacity level of the second mode text up to a second value (e.g., a minimum opacity value) so as to unmask the second mode text within the UI element 114. The change in the second opacity level may be based on the first mode text being masked and the received user input.

In other embodiments, the control circuitry 108 may control the display device 106 to concurrently change the first opacity level of the first mode text up to a first value to gradually mask the first mode text within the UI element 114, while changing the second opacity level of the second mode text up to the second value to gradually unmask the second mode text within the UI element 114. In certain embodiments, while the second opacity level changes, the control circuitry 108 may also control the display device 106 to move the second mode text within the UI element 114 so that the second mode text is unmasked as a scrolling text, within the UI element 114. Operations of the display system 102 are further provided in detail, for example, in FIG. 2.

Figure 2:
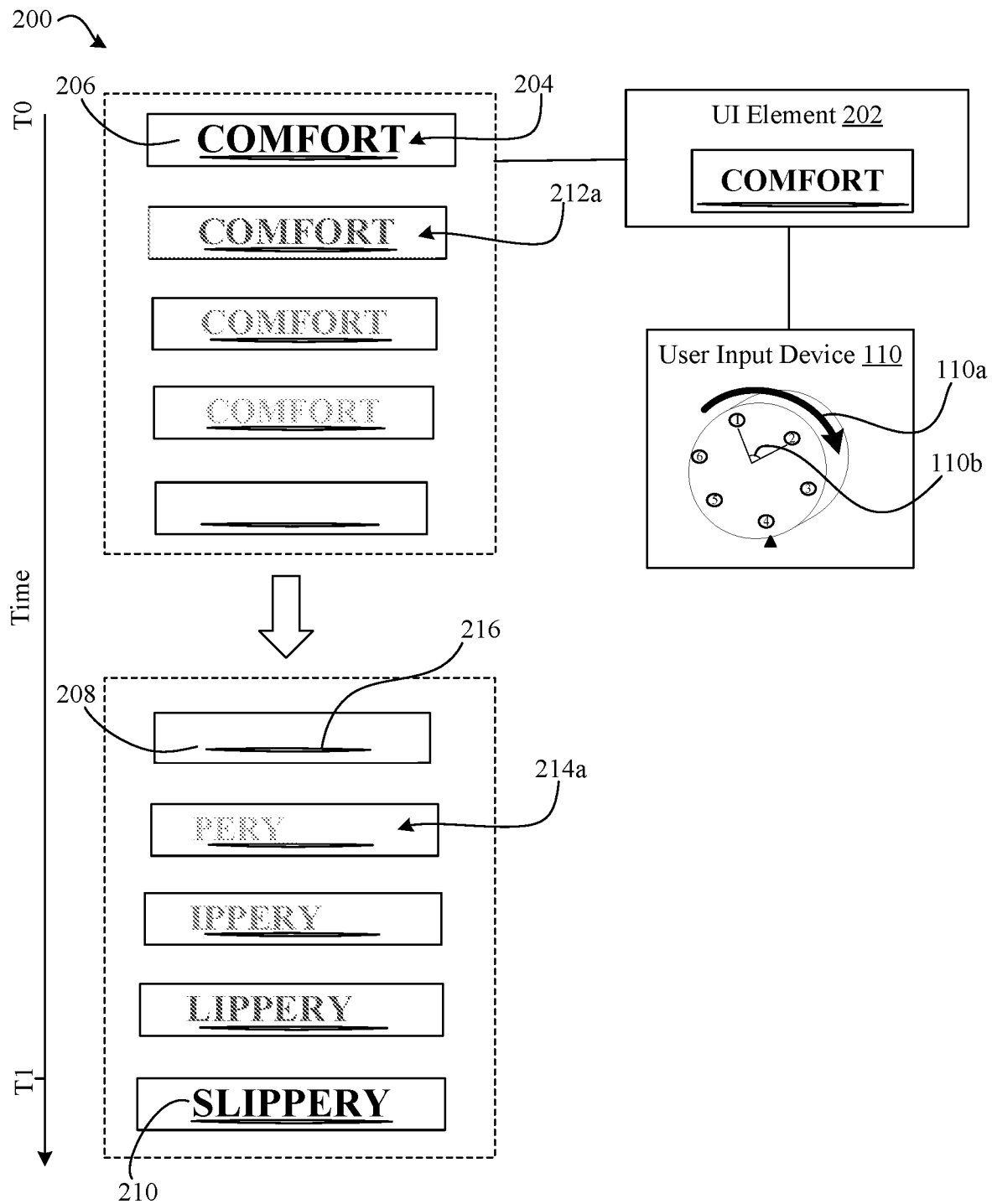
FIG. 2 is a diagram that illustrates an exemplary scenario for mode-information display with a scrolling text effect, in accordance with an embodiment of the disclosure.

FIG. 2 is a diagram that illustrates an exemplary scenario for mode-information display with a scrolling text effect, in accordance with an embodiment of the disclosure. FIG. 2 is explained in conjunction with FIG. 1. With reference to FIG. 2, there is shown an exemplary scenario 200. In the exemplary scenario, there is shown a UI element 202 displayed on the display device 106. The UI element 202 may include mode information, such as a mode text and/or one or more graphic elements to indicate a current driving mode of the vehicle 104. As shown, for example, the current driving mode may be the comfort mode and the mode text may be shown as "COMFORT" in a color, such as black.

At any time, the control circuitry 108 may receive a user input based on an input via the user input device 110. In case the user input device 110 is a knob, the received user input may include a rotation direction (e.g., a rotation direction 110a) of the user input device 110 and a degree of rotation (e.g., a degree of rotation 110b) in the rotation direction. Based on the received user input, the current driving mode may be determined to be the outgoing mode while an upcoming driving mode preceding or succeeding the current driving mode may be determined as the incoming mode. For example, both the incoming mode and the outgoing mode may be one of, the slippery mode, the comfort mode, the normal mode, the sports mode, the track mode, or the economy mode, and the like.

Herein, operations for transition between two exemplary driving modes (i.e. comfort and slippery modes) are provided. The present disclosure may also be applicable to transition between other driving modes, without deviating from the scope of the disclosure.

Initially, by default, the display device 106 may show a first mode text 204 ("COMFORT") with a first opacity level 206, for example, a default opacity value represented by "0%" in a range of 0% to 100%, where "0%" and "100%" may represent a minimum opacity value and a maximum opacity value, respectively. After receiving the user input, the control circuitry 108 may determine a first value up to which the first opacity level 206 of the first mode text 204 for the comfort mode may need to be changed based on the rotation direction and the degree of rotation in the rotation direction. Also, the control circuitry 108 may determine the second value up to which a second opacity level 208 of a second mode text 210 ("SLIPPERY") for the slippery mode may need to be changed based on the rotation direction and the degree of rotation in the rotation direction.

After the first value and the second value are determined, the control circuitry 108 may control the display device 106 to change the first opacity level 206 of the first mode text 204 for the comfort mode, up to the determined first value so as to mask the first mode text 204 within the UI element 202. In an exemplary embodiment, once the first mode text 204 is masked, the UI element 202 may show (e.g., represented by black or white) a background color of the UI element 202 in place of the first mode text 204. Thereafter, to unmask the second mode text 210 within the UI element 202, the control circuitry 108 may control the display device 106 to change the second opacity level 208 of the second mode text 210 for the slippery mode, up to the second value. In other embodiments, the control circuitry 108 may control the display device 106 to change the first opacity level 206 of the first mode text 204 up to the first value, so as to mask the first mode text 204 within the UI element 114, while concurrently changing the second opacity level 208 of the second mode text 210 up to the second value, so as to unmask the second mode text 210 within the UI element 114.

In an exemplary embodiment, the change in the first opacity level 206 may include a set of successive increments in the first opacity level 206 of the first mode text 204 while the change in the second opacity level 208 may include a set of successive decrements in the second opacity level 208 of the second mode text 210. By way of example, the first value and the second value may represent a maximum opacity level (100%) of the first mode text 204 and a minimum opacity level (0%) of the second mode text 210, respectively. The change in the first opacity level 206 may be indicated by successive increments. In one embodiment, the first opacity level 206 may be at 0% opacity level initially and may be incremented (as represented by a transition state 212a) by a certain percentage (e.g., 20%). Similarly, the first opacity level 206 of the first mode text 204 may be successively incremented (e.g., by 20%) until the first opacity level 206 is updated to the first value (represented by 100%).

Once the first value is attained, the first mode text 204 may appear to be completely masked within the UI element 202. In place of the first mode text 204, the second mode text 210 at the second opacity level 208 may be displayed. At the second opacity level 208 (e.g., at 100% opacity), the second mode text 210 may initially appear to be masked within the UI element 202. However, the second opacity level 208 may be decremented (as represented by a transition state 214a) by a certain percentage (e.g., 20%). Similarly, the second opacity level 208 may be successively decremented (e.g., by 20%) until the second opacity level 208 is updated to the second value (represented by 0%). At the second value (i.e. 0% opacity level), the second mode text 210 may be completely unmasked within the UI element 202.

In some embodiments, while changing the second opacity level 208 of the second mode text 210, the control circuitry 108 may be configured to control the display device 106 to move the second mode text 210 within the UI element 202. The second mode text 210 may appear to move horizontally or vertically as a scrolling text within the UI element 202. For example, as shown, a portion ("PERY") of the second mode text 210 in the transition state 214a appears as a horizontally scrolling text from left-to-right, while the second mode text 210 is being unmasked in the UI element 202.

In certain embodiments, based on the received user input, the control circuitry 108 may be configured to control the display device 106 to change a size (e.g., an initial size at 100%) of the first mode text 204 or the second mode text 210 up to a third value (e.g., 80% of the initial size). Such changes in the first mode text 204 may be performed, for example, while changing the first opacity level 206 of the first mode text 204. In other words, the change in the size of the first mode text 204 may include a set of successive decrements in the size, concurrently, with the set of successive increments in the first opacity level 206 of the first mode text 204.

In certain embodiments, the UI element 202 may also include a graphic element 216 which may be displayed, for example, as a graphic line or bar below the first mode text 204. In some embodiments, the graphic element 216 may be the same color as the text mode 204. In other embodiments, the color of the graphic element 216 may be based on the driving mode of the vehicle. For example, initially for the comfort mode, the color of the graphic element 216 may be set to a solid color, such as blue. At certain time instant, the control circuitry 108 may determine whether there is a different color pre-specified for the slippery mode. Based on such determination, the control circuitry 108 may update the color of the displayed graphic element 216. An example list of pre-specified colors of the graphic element 216 for different driving modes (i.e. incoming/outgoing modes) is provided in Table 1.

TABLE 1

List of pre-specified colors of the graphic element 216 for different driving modes

| Driving Mode | Pre-Specified Color |
|---|---|
| Slippery | White |
| Comfort | Blue |
| Normal | White |
| Sport | Red |
| Track | Red |

Based on Table 1, an example list of color changes may be determined for different incoming-outgoing mode pairs.

TABLE 2

List of color changes for different incoming-outgoing mode pairs

| Incoming Mode - Outgoing Mode | Color Change |
|---|---|
| Slippery - Comfort | Yes |
| Comfort - Normal | Yes |
| Normal - Sport | Yes |
| Sport - Track | No |
| Track - Slippery | Yes |

With reference to Table 1 and Table 2, for the outgoing mode as the comfort mode and the incoming mode as the slippery mode, the color of the graphic element 216 may need to be changed from blue to white.

Figure 3:
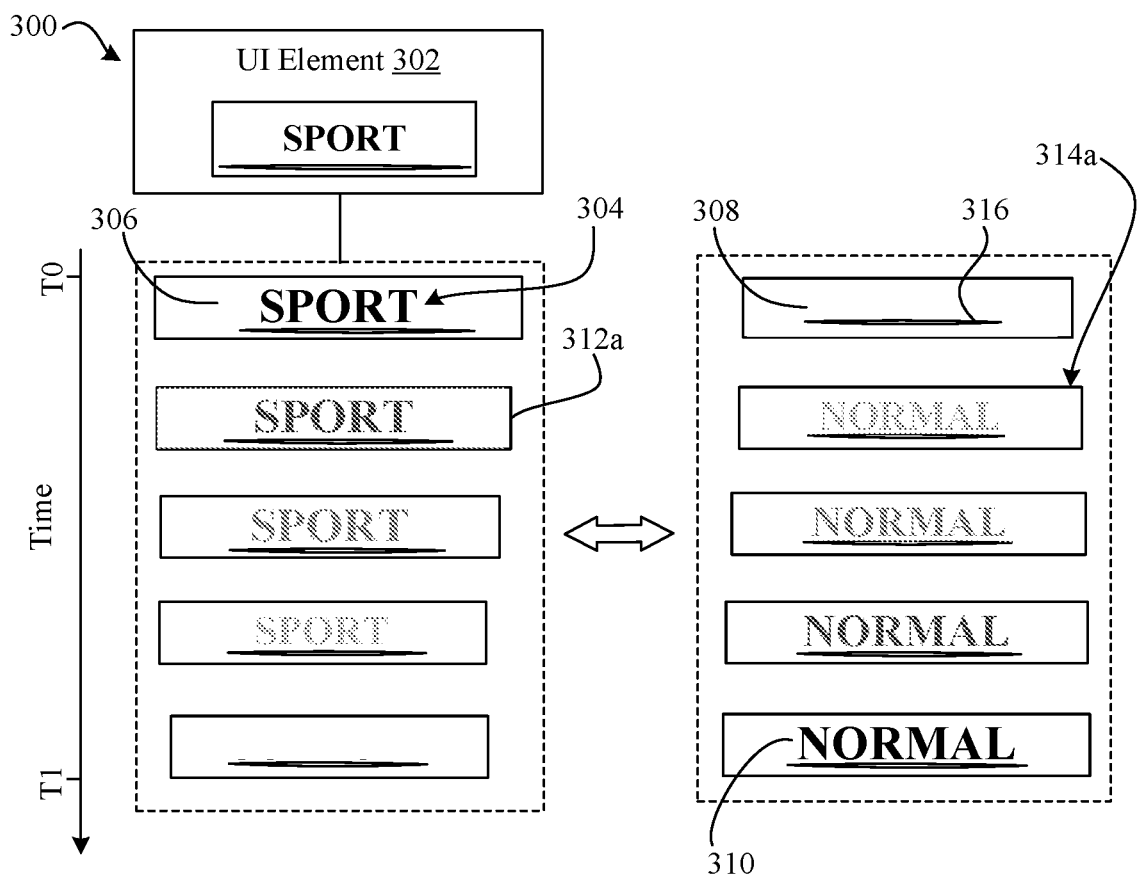
FIG. 3 is a diagram that illustrates an exemplary scenario for mode-information display without a scrolling text effect, in accordance with an embodiment of the disclosure.
Figure 3:
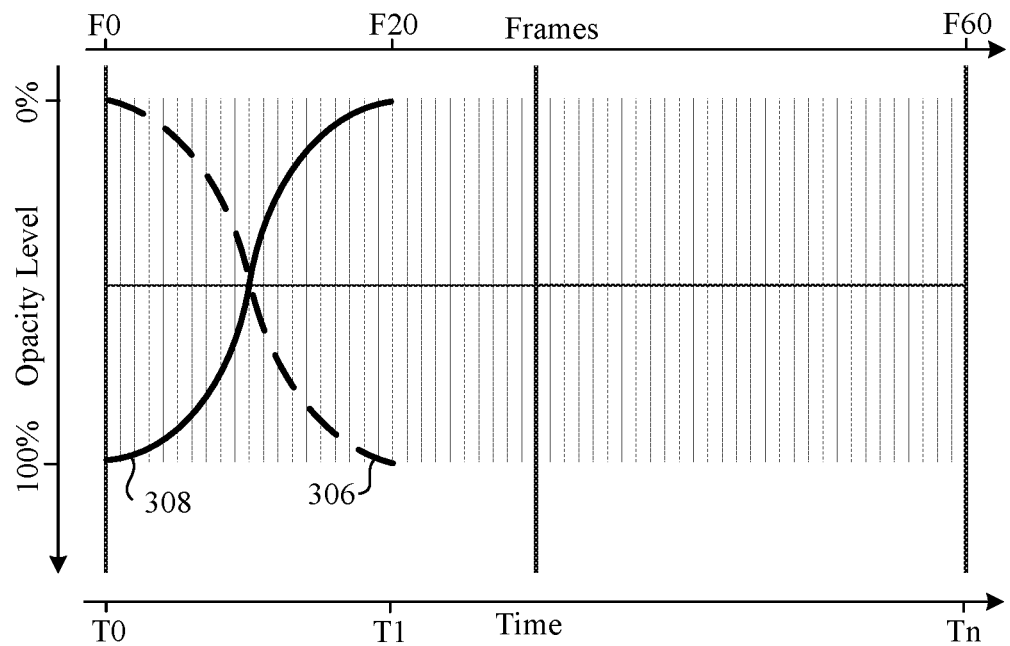

FIG. 3 is a diagram that illustrates an exemplary scenario for mode-information display without a scrolling text effect, in accordance with an embodiment of the disclosure. FIG. 3 is explained in conjunction with FIG. 1 and FIG. 2. With reference to FIG. 3, there is shown an exemplary scenario 300. In the exemplary scenario, there is shown a UI element 302 displayed on the display device 106. The UI element 302 may include mode information, such as a mode text and/or one or more graphic elements to indicate a current driving mode of the vehicle 104. As shown, for example, the current driving mode may be the sports mode and the mode text may be shown as "SPORT" in a color, such as black.

At any time, the control circuitry 108 may receive a user input based on an input via the user input device 110. In case the user input device 110 is a knob, the received user input may include a rotation direction (e.g., a rotation direction 110a) of the user input device 110 and a degree of rotation (e.g., a degree of rotation 110b) in the rotation direction. Based on the received user input, the current driving mode may be determined to be the outgoing mode while an upcoming driving mode preceding or succeeding the current driving mode may be determined as the incoming mode. For example, both the incoming mode and the outgoing mode may be one of, the slippery mode, the comfort mode, the normal mode, the sports mode, the track mode, or the economy mode, and the like.

Herein, operations for transition between two exemplary driving modes (i.e. sports and normal modes) are provided. The present disclosure may also be applicable to transition between other driving modes, without deviating from the scope of the disclosure.

Initially, by default, the display device 106 may show a first mode text 304 ("SPORT") with a first opacity level 306, for example, a default opacity value represented by "0%" in a range of 0% to 100%, where "0%" and "100" may represent a minimum opacity value and a maximum opacity value, respectively. After receiving the user input, the control circuitry 108 may determine a first value up to which the first opacity level 306 of the first mode text 304 for the sports mode may need to be changed based on the rotation direction and the degree of rotation in the rotation direction. Also, the control circuitry 108 may determine the second value up to which a second opacity level 308 of a second mode text 310 ("NORMAL") of the normal mode may need to be changed based on the rotation direction and the degree of rotation in the rotation direction.

After the first value and the second value are determined, the control circuitry 108 may control the display device 106 to change the first opacity level 306 of the first mode text 304 for the sports mode, up to the determined first value so as to mask the first mode text 304 within the UI element 302. While the first mode text 304 is being masked, the control circuitry 108 may concurrently unmask the second mode text 310 within the UI element 302. The second mode text 310 may be unmasked by changing the second opacity level 308 of the second mode text 310 for the normal mode, up to the second value.

In an exemplary embodiment, the change in the first opacity level 306 may include a set of successive increments in the first opacity level 306 of the first mode text 304 while the change in the second opacity level 308 may include a set of successive decrements in the second opacity level 308 of the second mode text 310. By way of example, the first value and the second value may represent a maximum opacity level (100%) and a minimum opacity level (0%), respectively.

Initially, the first opacity level 306 may be at 0% opacity level, as shown. The first opacity level 306 of the first mode text 304 may be incremented (as represented by a transition state 312a) by a certain percentage (e.g., 20%) with a movement (e.g., a 10° change in a clockwise direction) of the user input device 110. Similarly, the first opacity level 306 of the first mode text 304 may be successively incremented (e.g., by 20%) until the first opacity level 306 is updated to the first value (represented by 100%). Once the first value is attained, the first mode text 304 may appear to be completely masked in the UI element 302 and in place of the first mode text 304, the second mode text 310 at a minimum opacity level (e.g., 0%, as shown) may be displayed. Herein, the transition of the first mode text 304 from an unmasked state to a masked state may be concurrent with the transition of the second mode text 310 from the masked state to the unmasked state. Therefore, while the first mode text 304 may appear to fade away, at the same time, the second mode text 310 may start to appear with a color intensity that increases up to a maximum value (e.g., 100%). Initially, at the second opacity level 308 (e.g., at 100% opacity), the second mode text 310 may appear to be masked within the UI element 302. However, the second opacity level 308 may be decremented (as represented by a transition state 314a) by a certain percentage (e.g., 20%). Similarly, the second opacity level 308 may be successively decremented (e.g., by 20%) until the second opacity level 308 is updated to the second value (represented by 0%). At the second value (i.e. 0% opacity level), the second mode text 310 may be completely unmasked within the UI element 302.

An example graph is also illustrated in FIG. 3 to describe a concurrent variation in opacity levels for both the first mode text 304 and the second mode text 310. The first opacity level 306 of the first mode text 304 may gradually increase from 0% to 100% from the time T0 to T1. The number of frames between T0 and T1 may include, for example, 20 frames. The first opacity level 306 may increase from 0% to 100% within a duration of the 20 frames when the first mode text 304 is rendered at a frame rate of 60 frames per second. Concurrently, the second opacity level 308 of the second mode text 310 may gradually decrease from 100% to 0% between the same period, i.e. between T0 and T1. The second opacity level 308 may decrease from 100% to 0% within the duration of 20 frames when the second mode text 310 is rendered at a frame rate of 60 frames per second.

In certain embodiments, the UI element 302 may also include a graphic element 316 which may be displayed, for example, as a graphic line or bar below the first mode text 304. In some embodiments, the graphic element 316 may be the same color as the text mode 304. In other embodiments, the color of the graphic element 316 may be based on the driving mode of the vehicle. For example, initially, for the sports mode, the color of the graphic element 316 may be set to a solid color, such as red for the sports mode. At certain time instant, the control circuitry 108 may determine whether there is a different color pre-specified for the normal mode (i.e., white). Based on such determination, the control circuitry 108 may update the color of the displayed graphic element 316. In an exemplary embodiment, the color change of the displayed graphic element 316 may gradually change from a first color (e.g., red for the sports mode) to a second color (e.g., white for the normal mode) concurrently with the transition of the first mode text 304 from the unmasked state to the masked state and second mode text 310 from the masked state to the unmasked state.

Figure 4:
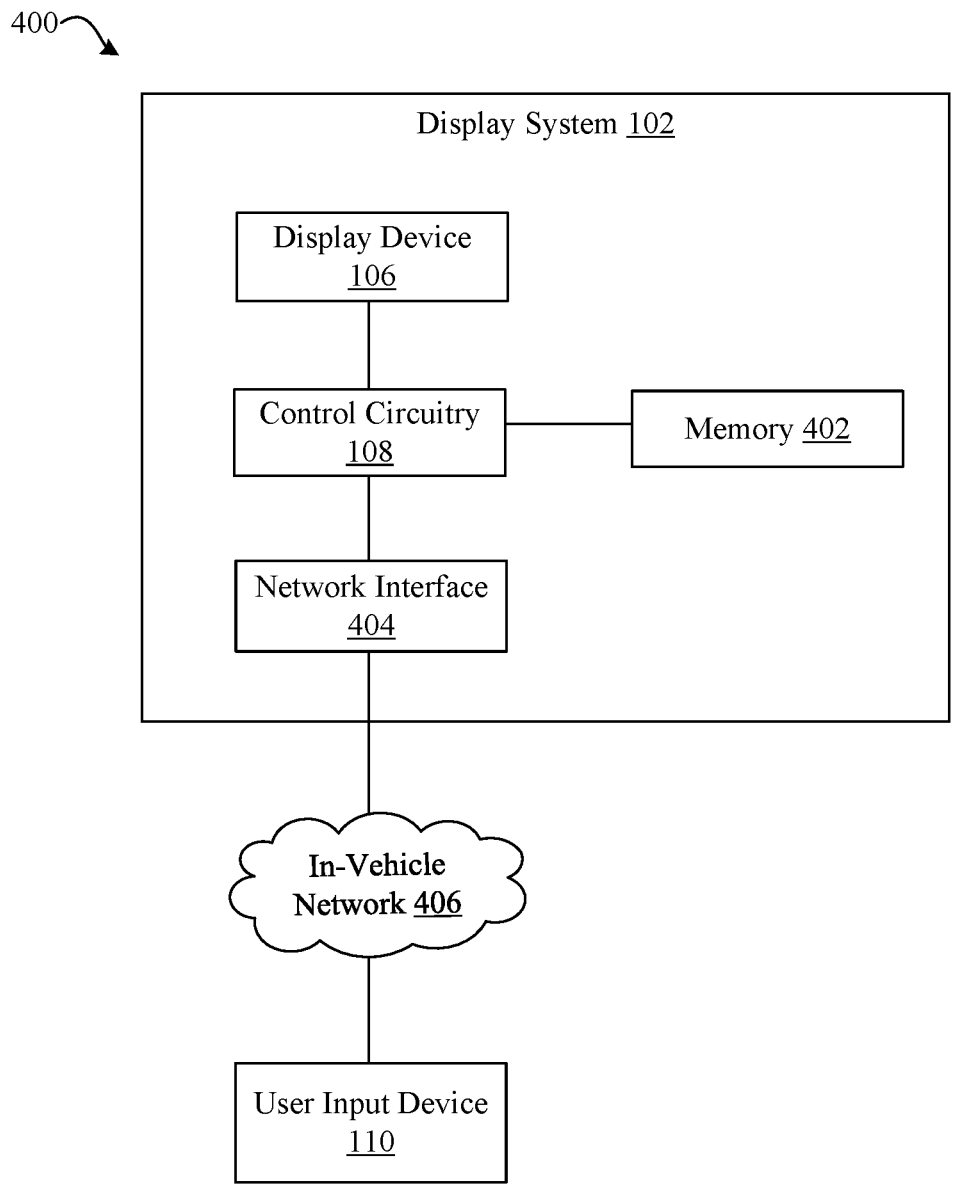
FIG. 4 illustrates an exemplary block diagram of the display system of FIG. 1, in accordance with an embodiment of the disclosure.

FIG. 4 illustrates an exemplary block diagram of the display system of FIG. 0.1, in accordance with an embodiment of the disclosure. FIG. 4 is explained in conjunction with FIGS. 1, 2, and 3. With reference to FIG. 4, there is shown an exemplary block diagram 400 of the display system 102 of FIG. 1. In the exemplary block diagram 400, there is shown the display system 102 that includes a memory 402 to store the mode information and a network interface 404 to communicate with the user input device 110 in addition to the display device 106 and the control circuitry 108. The network interface 404 may communicate with the user input device 110 through an in-vehicle network 406.

The memory 402 may include suitable logic, circuitry, and interfaces that may be configured to store instructions to be executed by the control circuitry 108. The memory 402 may also store the mode information for both incoming and outgoing modes. Examples of implementation of the memory 402 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 404 may include suitable logic, circuitry, and interfaces that may be configured to facilitate communication between the control circuitry 108 and the user input device 110, via the in-vehicle network 406. The network interface 404 may be implemented by use of various known technologies to support wired or wireless communication of the display system 102 with the in-vehicle network 406.

The network interface 404 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 404 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The in-vehicle network 406 may include a medium through which the various control units, components, and/or systems of the vehicle 104 may communicate with each other. In accordance with an embodiment, in-vehicle communication of information may occur by use of Media Oriented Systems Transport (MOST) protocol of the in-vehicle network 406 or other suitable network protocols for vehicle communication. The MOST-based network may be a separate network from the controller area network (CAN) and may use a plastic optical fiber (POF) medium. In accordance with an embodiment, the MOST-based network, the CAN, and other in-vehicle networks may co-exist in the vehicle 104. The in-vehicle network 406 may facilitate access control and/or communication between the control circuitry 108 and other ECUs, such as ECM or a telematics control unit (TCU) of the vehicle 104.

Various devices or components in the vehicle 104 may connect to the in-vehicle network 406, in accordance with various wired and wireless communication protocols. Examples of the wired and wireless communication protocols for the in-vehicle network 406 may include, but are not limited to, a vehicle area network (VAN), a CAN bus, Domestic Digital Bus (D2B), Time-Triggered Protocol (TTP), Flex-Ray, IEEE 1394, Carrier Sense Multiple Access With Collision Detection (CSMA/CD) based data communication protocol, Inter-Integrated Circuit (I²C), Inter Equipment Bus (IE-Bus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

Figure 5:
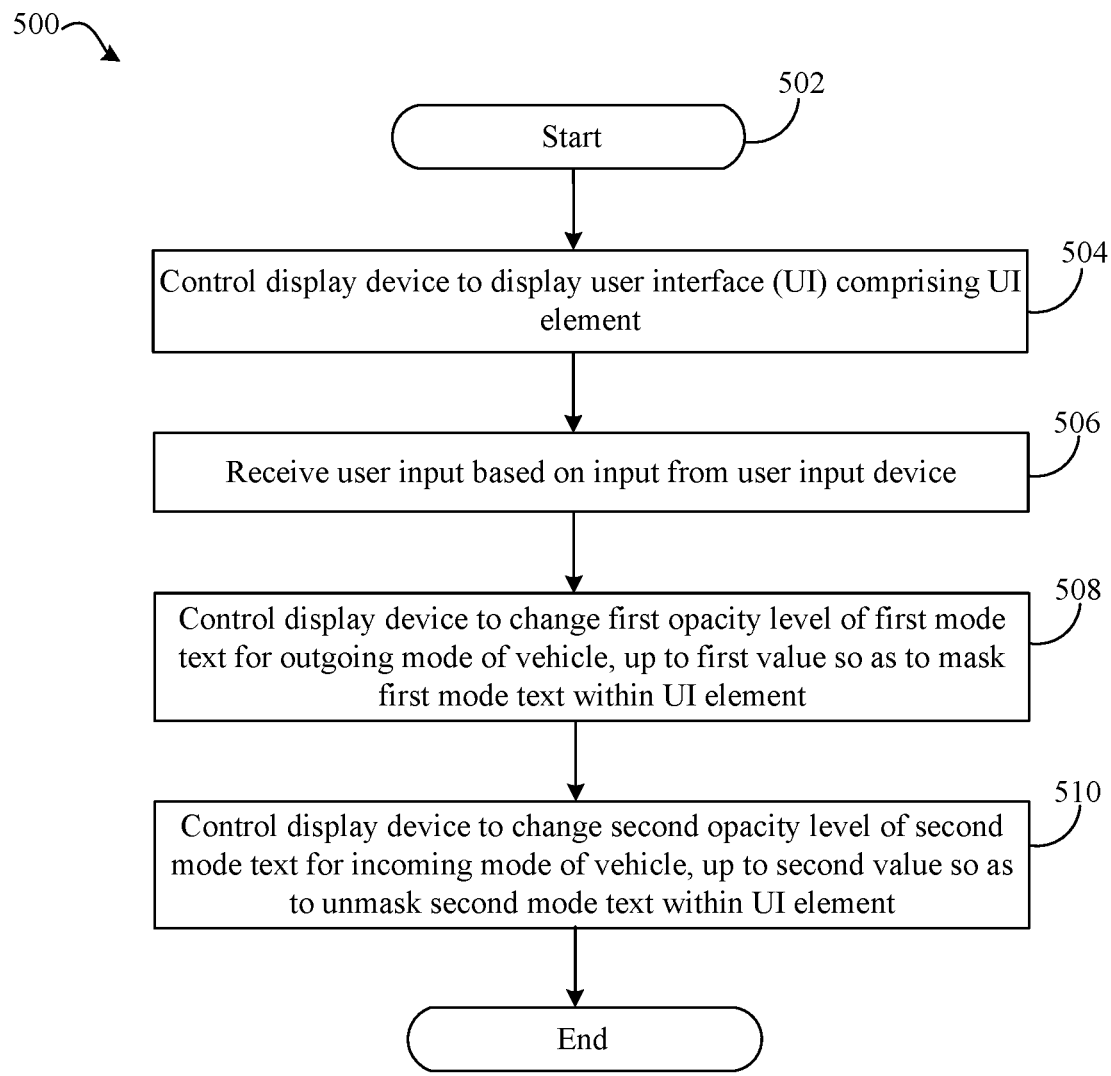
FIG. 5 illustrates a flowchart of an exemplary method for displaying mode information on a display device, in accordance with an embodiment of the disclosure.

FIG. 5 illustrates a flowchart of an exemplary method for displaying mode information on a display device, in accordance with an embodiment of the disclosure. FIG. 5 is explained in conjunction with elements from FIGS. 1, 2, 3, and 4. With reference to FIG. 5, there is shown a flowchart 500 that depicts a method for displaying mode information. Any display system, for example, the display system 102 of the vehicle 104, may execute operations specified in the method. The method illustrated in the flowchart 500 may start from 502 and proceed to 504.

At 504, the display device 106 may be configured to display the UI 112 having the UI element 114. In an embodiment, the control circuitry 108 may be configured to control the display device 106 to display the UI 112 having the UI element 114.

At 506, the display system 102 may be configured to receive a user input based on an input of the user input device 110. In an embodiment, the control circuitry 108 may be configured to receive the user input based on the input of the user input device 110.

At 508, a first opacity level of a first mode text may be changed up to a first value for an outgoing mode of the vehicle 104 so as to mask the first mode text within the UI element 114. In an embodiment, the control circuitry 108 may be configured to change the first opacity level of the first mode text in the outgoing mode, up to the first value so as to mask the first mode text within the UI element 114. Operations of the control circuitry 108 to change the first opacity level are described in detail, for example, in FIGS. 2 and 3.

At 510, a second opacity level of a second mode text may be changed up to the second value for an incoming mode of the vehicle so as to unmask the second mode text within the UI element 114. In an embodiment, the control circuitry 108 may be configured to change the second opacity level of the second mode text up to the second value for the incoming mode so as to unmask the second mode text within the UI element 114. Control may pass to end. Operations of the control circuitry 108 to change the second opacity level are described in detail, for example, in FIGS. 2 and 3.

The flowchart 500 is illustrated as discrete operations, such as 502, 504, 506, 508, and 510. However, in certain embodiments, such discrete operations may be further divided into additional operations, combined into fewer operations, or eliminated, depending on the particular implementation without any deviation from the scope of the disclosure.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A display system for a vehicle, comprising:
a display device; and
control circuitry communicatively coupled to a user input device and the display device, wherein the control circuitry is configured to:
control the display device to display a user interface (UI) comprising a UI element;

receive a user input based on an input of the user input device, wherein the received user input comprises a rotation direction and a degree of rotation in the rotation direction;

control the display device to change a first opacity level of a first mode text for an outgoing mode of the vehicle to a first value so as to mask the first mode text within the UI element, wherein the first opacity level of the first mode text is changed based on the received user input;

control the display device to change a second opacity level of a second mode text for an incoming mode of the vehicle to a second value so as to unmask the second mode text within the UI element, wherein the second opacity level of the second mode text is changed based on the first mode text being masked and the received user input, determine at least one of the first value to which the first opacity level of the first mode text is to be changed based on the degree of rotation and the rotation direction and the second value to which the second opacity level of the second mode text is to be changed based on the degree of rotation and the rotation direction; and control the display device to move the second mode text within the UI element while changing the second opacity level of the second mode text.

2. The display system according to claim 1, wherein the display device is one of a Multi-Information Display (MID), an automotive Head-Up Display (HUD), or an instrument cluster.

3. The display system according to claim 1, wherein the incoming mode is one of a slippery mode, a comfort mode, a normal mode, a sports mode, a track mode, or an economy mode of the vehicle.

4. The display system according to claim 1, wherein the outgoing mode is one of a slippery mode, a comfort mode, a normal mode, a sports mode, a track mode, or an economy mode of the vehicle.

5. The display system according to claim 1, wherein the control circuitry is further configured to control the display device to change a size of the first mode text or the second mode text up to a third value, based on the received user input.

6. The display system according to claim 5, wherein the control circuitry is further configured to control the display device to change the size of the first mode text while changing the first opacity level of the first mode text.

7. The display system according to claim 5,
wherein the change of the first opacity level comprises a set of successive increments in the first opacity level of the first mode text, and
wherein the change of the size of the first mode text comprises a set of successive decrements in the size of the first mode text, concurrently, with the set of successive increments in the first opacity level of the first mode text.

8. The display system according to claim 1, wherein the control circuitry is further configured to control the display device to:
display a graphic element for the outgoing mode within the UI element; and
update a color of the displayed graphic element based on a determination that a color pre-specified for the incoming mode is different from the color of the displayed graphic element for the outgoing mode.

9. The display system according to claim 8, wherein the graphic element is displayed below the first mode text within the UI element.

10. The display system according to claim 1, wherein the second mode text is moved horizontally or vertically as a scrolling text within the UI element.

11. A display system for a vehicle, comprising:
a display device; and
control circuitry communicatively coupled to a user input device and the display device, wherein the control circuitry is configured to:
control the display device to display a user interface (UI) comprising a UI element;
receive a user input based on an input of the user input device, wherein the received user input comprises a rotation direction and a degree of rotation in the rotation direction;
control the display device to change a first opacity level of a first mode text for an outgoing mode of the vehicle to a first value so as to mask the first mode text within the UI element, wherein the first opacity level of the first mode text is changed based on the received user input;
control the display device to change a second opacity level of a second mode text for an incoming mode of the vehicle to a second value so as to unmask the second mode text within the UI element, wherein the second opacity level of the second mode text is changed based on the first mode text being masked and the received user input; and
determine at least one of the first value to which the first opacity level of the first mode text is to be changed based on the degree of rotation and the rotation direction and the second value to which the second opacity level of the second mode text is to be changed based on the degree of rotation and the rotation direction.

12. The display system according to claim 11, wherein the change of the first opacity level comprises a set of successive increments in the first opacity level of the first mode text, and wherein the change of the second opacity level comprises a set of successive decrements in the second opacity level of the second mode text, concurrently, with the set of successive increments in the first opacity level of the first mode text.

13. A method, comprising:
in a display system that comprises a display device communicatively coupled to a user input device:
controlling the display device to display a user interface (UI) comprising a UI element;
receiving a user input based on an input of the user input device, wherein the received user input comprises a rotation direction and a degree of rotation in the rotation direction;
controlling the display device to change a first opacity level of a first mode text for an outgoing mode of a vehicle to a first value so as to mask the first mode text within the UI element, wherein the first opacity level of the first mode text is changed based on the received user input;
controlling the display device to change a second opacity level of a second mode text for an incoming mode-of the vehicle to a second value so as to unmask the second mode text within the UI element, wherein the second opacity level of the second mode text is changed based on the first mode text being masked and the received user input; and determining at least one of the first value to which the first opacity level of the first mode text is to be changed based on the degree of rotation and the rotation direction and the second value to which the second opacity level of the second mode text is to be changed based on the degree of rotation and the rotation direction.

14. The method according to claim 13, wherein the controlling further comprises changing a size of the first mode text or the second mode text up to a third value, based on the received user input.

15. The method according to claim 14, wherein the controlling further comprises changing the size of the first mode text while changing the first opacity level of the first mode text.

16. The method according to claim 15, wherein the changing of the first opacity level comprises a set of successive increments in the first opacity level of the first mode text, and wherein the changing of the size of the first mode text comprises a set of successive decrements in the size of the first mode text, concurrently, with the set of successive increments in the first opacity level of the first mode text.

17. The method according to claim 13, wherein the controlling further comprises:

displaying a graphic element for the outgoing mode within the UI element; and updating a color of the displayed graphic element based on a determination that a color pre-specified for the incoming mode is different from the color of the displayed graphic element for the outgoing mode.

18. The method according to claim 13, wherein the controlling further comprises: controlling the display device to move the second mode text horizontally or vertically as scrolling text within the UI element while changing the second opacity level of the second mode text.

19. The display system according to claim 11, wherein the change of the first opacity level of the first mode text occurs concurrently with the change of the second opacity level of the second mode text.

20. The display system according to claim 11, wherein the control circuitry is further configured to control the display device to change at least one of a size of the first mode text while changing the first opacity level of the first mode text and a size of the second mode text while changing the second opacity level of the second mode text.

* * * * *